J. V. BECKA.
BOX FOR ELECTRIC METERS.
APPLICATION FILED OCT. 27, 1917.

1,292,682.

Patented Jan. 28, 1919.
2 SHEETS—SHEET 1.

INVENTOR,
John V. Becka.
BY Baker & Mackelin
ATT'YS.

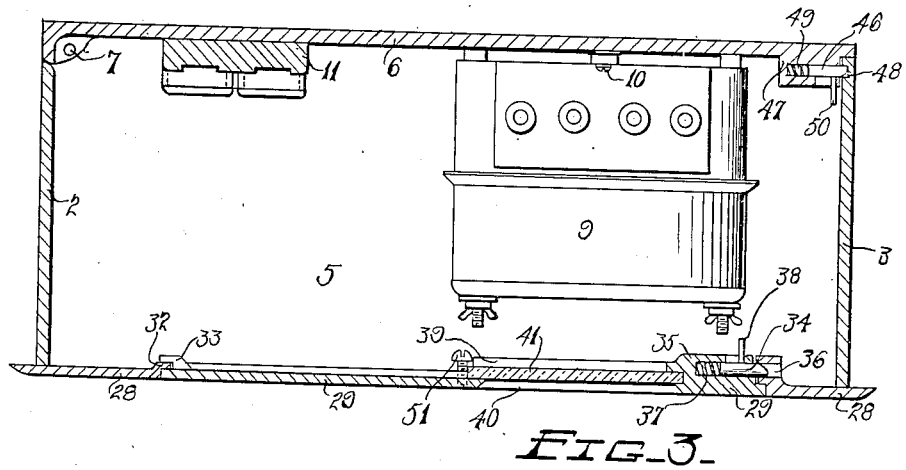
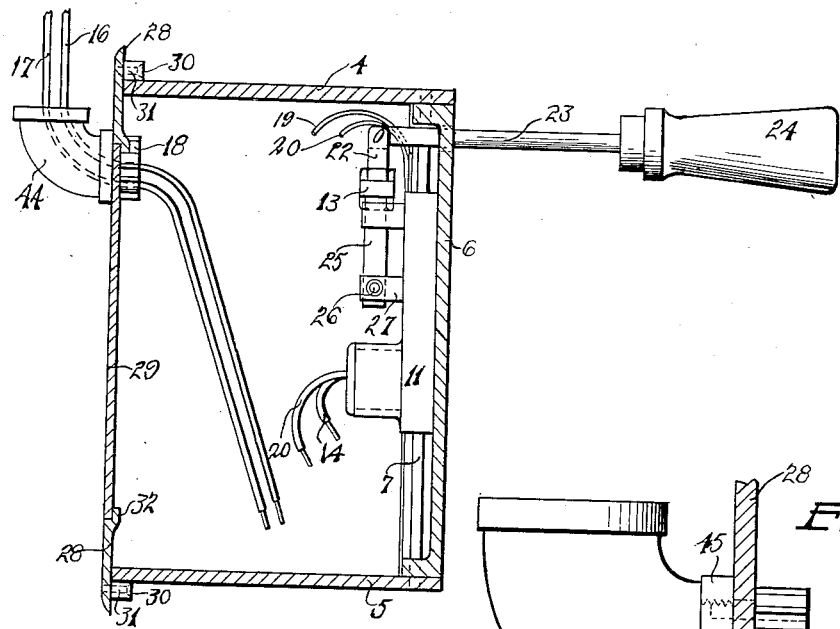
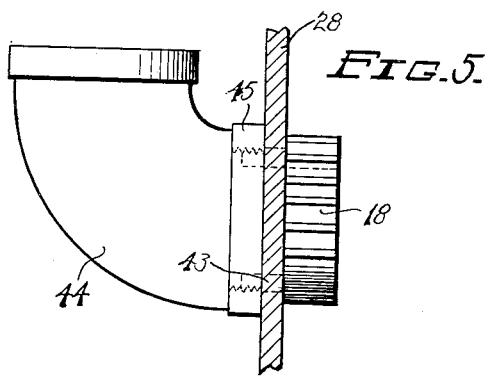

UNITED STATES PATENT OFFICE.

JOHN V. BECKA, OF CLEVELAND, OHIO.

BOX FOR ELECTRIC METERS.

REISSUED

1,292,682.   Specification of Letters Patent.   Patented Jan. 28, 1919.

Application filed October 27, 1917. Serial No. 198,807.

*To all whom it may concern:*

Be it known that I, JOHN V. BECKA, a citizen of the United States, residing at Cleveland, in the county of Cuyahoga and State of Ohio, have invented a certain new and useful Improvement in Boxes for Electric Meters, of which the following is a full, clear, and exact description, reference being had to the accompanying drawings.

An object of this invention is to provide a meter housing so constructed that it may be built into the wall of a building (preferably the foundation wall), and permit the meter being read from the exterior of the building while a switch within the housing may be operated from the interior of the building. Another object is to provide a meter housing affording ample protection for a meter contained within, particularly against surreptitious meddling, and at the same time having removable front and rear walls, thereby making the interior readily accessible when necessary. My device is comparatively cheap to manufacture, and has no parts liable to get out of order.

My invention is hereinafter more fully described in connection with the accompanying drawings. The essential characteristics are set forth in the claims.

Figure 1:
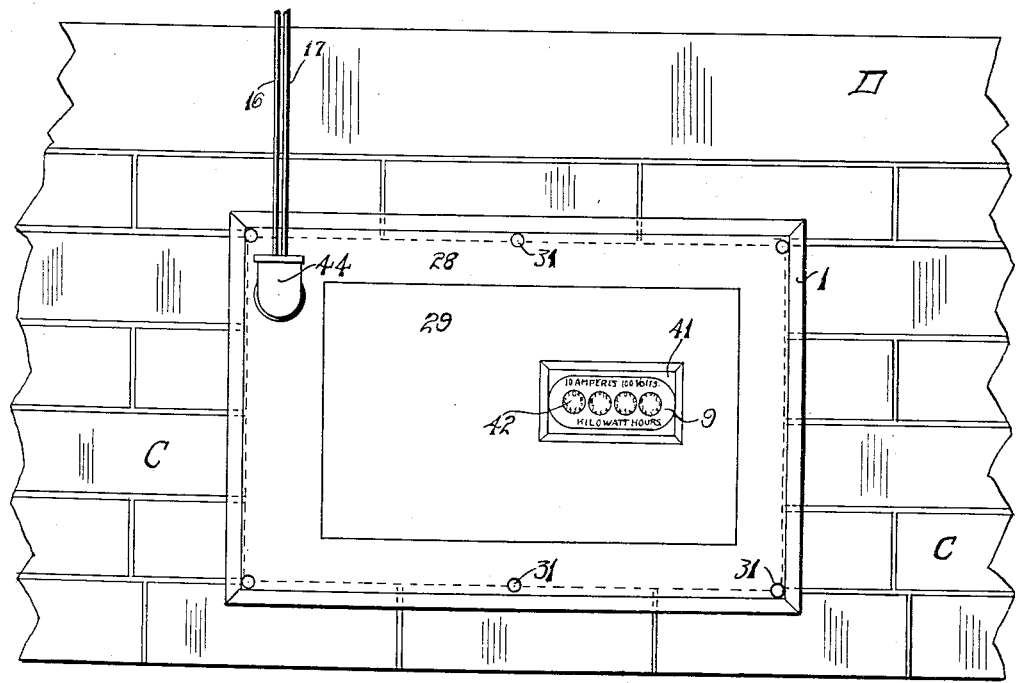
Figure 2:
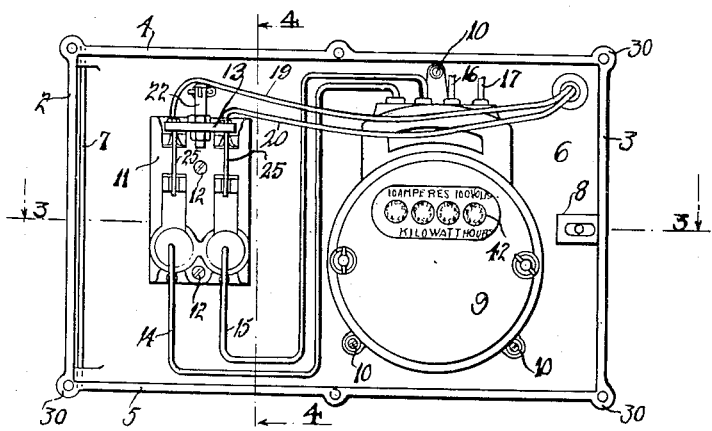

In the drawings, Figure 1 is a side elevation of a meter housing built in position in a building wall; Fig. 2 is a view of the interior of the same with the front cover removed; Fig. 3 is a horizontal section through the same on the line 3—3 of Fig. 2; Fig. 4 is a vertical section on the line 4—4 of Fig. 2; Fig. 5 is an enlarged detail of the removable elbow through which the main conductors pass.

In Fig. 1, I have shown my device held in position in a wall by means of brick work C, 1 indicates the housing itself having end walls 2 and 3 and top and bottom walls 4 and 5 preferably formed integrally with one another. The rear wall 6 is hinged by a rod 7 to the top and bottom walls and when closed fits tightly between the top and bottom wall.

The rear wall 6 is normally closed by a latch, as shown in Fig. 3. This latch comprises a plunger 46, carried within a boss 47 on the rear wall 6, normally forced into a recess 48 in the end wall 3 by means of a spring 49. The plunger 46 carries an outwardly extending pin 50 which may be engaged by one's finger within the box to withdraw the plunger 46 out of engagement with the recess 48.

An electric meter 9 is attached to the rear wall 6 by means of screws 10. Adjoining the meter is an insulating block 11 held to the rear wall by means of screws 12 and carrying a knife blade switch. Two lead wires 14 and 15 connect the terminals of the switch with the meter. Main wires 16 and 17 through a removable elbow 18, connect the meter with the trunk circuit. The wires 19 and 20 connect the fuses 21 with the lighting circuit within the building.

Rigid with the knife blades 25 is a bridge member 13, which carries an upwardly projecting stud 22, pivotally connected to the inner end of a rod 23, extending loosely through an opening in the casing and provided with a handle 24. The knife blades are pivoted in the usual manner, so that the switch may be opened or closed by moving the rod, which may be accomplished by an operator within the building.

The front wall or cover of the casing preferably comprises two plates 28 and 29, in the same plane. The plate 28 is permanently secured to lugs 30 on the top, bottom and side walls of the housing by means of bolts or screws 31. In the plate 28 is a large rectangular opening surrounded by inwardly offset flanges 32, which position the plate 29 fitting this opening. Lugs 33 integral with the plate 28 extend inwardly and embrace the flange while the opposite end of the plate 29 is secured by means of a latch. This latch comprises a plunger 34 slidable in a boss 35 on the plate 28 by means of a spring 37. The plunger 34 carries an outwardly extending pin 38, which may be engaged by one's finger within the box to draw the plunger 34 out of engagement with its recess.

The plate 29 has grooved portions 39 adjacent the opening 40 which carry a pane of glass 41. This glass pane stands directly in front of the dials 42 of the meter. The meter may accordingly be read from the outside through the glass without opening the box. Should it be necessary to open the box, this is accomplished by breaking the glass, inserting the fingers through the opening and pulling back the latch 34. The glass pane is preferably stamped or marked officially, so if broken, it must be replaced by an authorized person, otherwise notice is automatically given of tampering.

A screw 51 prevents removal of the glass while allowing replacement before the plate 29 is positioned. Breaking the glass permits removal of the plate 29, as stated, and then access may be had to the rear cover when the plate 29 is off, but merely breaking the glass does not cause opening of the rear door. The releasing of the latch 46 from within the box enables the rear door with the meter fuses and switch to swing into the building to allow testing, removing or installing of the meter or other parts from the inside.

In Fig. 5, I have shown a detail of a removable elbow 43, through which the main conductors enter. This elbow is held by a bushing 18 which passes through the wall 28 and screws into the elbow, until flanges 45 of the elbow and an enlarged head on the bushing firmly engages the plate 28 on the opposite sides.

It will be noticed that in this invention, the casing or box may readily be of such size that it takes the place of a convenient number of bricks of one or more of the stones in the foundation wall of a building. The stationary front overhangs the opening occupied by the box, making the construction weather tight. The whole device is inexpensive, and accomplishes the very desirable result of allowing the inspector to read the meter without requiring access to the building. This saves loss of time for the inspector and relieves the occupants of the building from intrusion.

Having thus described my invention, what I claim is:

1. In a device of the character described, the combination of a casing adapted to be placed in a wall of a building and entirely inclosing a meter, a glass window opposite the meter in the outer wall of the casing, a switch operable from the interior of the building, and closures allowing access to the casing latches for the closures accessible only from the interior of the casing.

2. A housing adapted to be built into a wall comprising a box having four stationary walls and a removable front and rear wall the rear wall being adapted to swing inwardly, the front wall being removable, blind latches preventing such movement, and a window for reading the meter.

3. A housing having parallel end walls and top and bottom walls adapted to be built into the wall of the building, a front wall having an orifice permitting access to the casing, the rear wall being hinged to swing inwardly, the meter and switch being carried by the rear wall, and a blind lock for the rear wall operable from the interior and accessible from the outside only.

4. A meter housing having end walls and parallel connecting top and bottom walls and a removable front wall and adapted to be built into the wall of a building, a rear wall for the housing hinged at one end and swinging into the rear side of the box and arranged to closely fit at its top and bottom edges between the top and bottom walls, a latch operable from the interior only and acting to hold the rear wall closed, and a window in the front wall opposite the meter.

5. The combination of a casing, an electric meter and an electric switch within the casing, means extending through the rear wall of the casing for operating the switch, a removable front wall for the casing, a glass pane carried by the front wall in juxtaposition with the meter face, and a blind latch for the front wall accessible through the opening occupied by the glass pane.

6. The combination of a casing, a hinged rear wall therefor, a meter carried by the rear wall and facing in the opposite direction, a removable front plate for the casing having a sight opening opposite the face of the meter, latches for the hinged rear wall and the front plate accessible only from the interior of the casing, and a glass pane normally closing the opening through the front plate and secured in place by means on the inner side of the plate.

7. The combination of a casing having an overhanging front, a rear wall hinged to the casing, an electric meter secured by the rear wall and facing outwardly, a window through the front standing opposite the meter when it is in the casing, and a lock for the rear wall accessible from the interior.

In testimony whereof, I hereunto affix my signature.

JOHN V. BECKA.